(12) United States Patent
Diamant et al.

(10) Patent No.: US 10,387,350 B1
(45) Date of Patent: *Aug. 20, 2019

(54) CONFIGURABLE SPONGE FUNCTION ENGINE

(71) Applicant: AMAZON TECHNOLOGIES, INC., Seattle, WA (US)

(72) Inventors: Ron Diamant, Nesher (IL); Ori Weber, Tel-Aviv (IL); Omer Shaked, Yavne (IL)

(73) Assignee: Amazon Technologies, Inc., Seattle, WA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/851,450

(22) Filed: Dec. 21, 2017

Related U.S. Application Data

(63) Continuation of application No. 14/869,775, filed on Sep. 29, 2015, now Pat. No. 9,880,960.

(60) Provisional application No. 62/182,206, filed on Jun. 19, 2015.

(51) Int. Cl.
*G06F 13/40* (2006.01)
*G06F 13/42* (2006.01)

(52) U.S. Cl.
CPC ...... *G06F 13/4027* (2013.01); *G06F 13/4221* (2013.01)

(58) Field of Classification Search
CPC .............................. G06F 13/40; G06F 13/42
See application file for complete search history.

(56) References Cited

U.S. PATENT DOCUMENTS

| | | | |
|---|---|---|---|
| 7,142,669 B2 | 11/2006 | Dworkin et al. | |
| 8,712,039 B2 | 4/2014 | Ebeid et al. | |
| 8,832,450 B2 | 9/2014 | Ciet et al. | |
| 9,438,416 B2 | 9/2016 | Kurdziel et al. | |
| 2010/0049986 A1* | 2/2010 | Watanabe et al. | .... H04L 9/0643 713/181 |
| 2015/0244685 A1 | 8/2015 | Shah et al. | |
| 2016/0117073 A1 | 4/2016 | Chun | |
| 2016/0283133 A1 | 9/2016 | Gusev | |
| 2017/0168749 A1 | 6/2017 | Grube et al. | |

\* cited by examiner

*Primary Examiner* — Henry Tsai
*Assistant Examiner* — Christopher Daley
(74) *Attorney, Agent, or Firm* — Blank Rome LLP

(57) ABSTRACT

A configurable sponge function engine. The configurable engine includes a register having bitrate and capacity sections, each having a variable size, where a sum of the bitrate and capacity sizes is fixed. A controller generates a bitrate size indication. A configurable message processor receives an input message from an input bus, receives the size indication, fragments the input message into fragmented blocks of a size specified by the size indication, and converts the blocks to a bus width of the bitrate and capacity sizes. An iterative calculator receives the blocks, performs iterative processing operations on the blocks, and stores a result of each operation in the register overwriting a previous register value. An output adaptor receives a value stored in the register after the block corresponding to the end of the input message is processed and outputs the register value converted to have an output bus width.

19 Claims, 8 Drawing Sheets

CONFIGURABLE SPONGE FUNCTION ENGINE

CROSS-REFERENCE TO RELATED APPLICATIONS

This application claims priority to U.S. patent application Ser. No. 14/869,775 filed Sep. 29, 2015 titled "Configurable Sponge Function Engine" which claims priority to U.S. Provisional Patent Application No. 62/182,206 filed Jun. 19, 2015 and titled "Configurable Sponge Function," both of which are incorporated herein by reference in its entirety for all purposes.

BACKGROUND

Sponge functions are a class of cryptographic algorithms. They have finite internal states that take input bit streams of various lengths (e.g., any length) and produce output bit streams of various lengths (e.g., any desired length). Sponge functions may be used to model or implement cryptographic primitives, such as cryptographic hashes, message authentication codes, stream ciphers, block ciphers, pseudo-random number generators, and authenticated encryption.

Sponge function hardware calculators often apply a particular standard, such as the Secure Hash Algorithm (SHA), which results in specific bus widths that are tailored to the particular SHA, and thus usually cannot be scaled or upgraded to implement other algorithms. Thus, conventional sponge function hardware calculators must be replaced when a security standard changes or a customer need necessitates the use of a different algorithm.

BRIEF DESCRIPTION OF THE DRAWINGS

The application describes various embodiments of the disclosed technologies with reference to the accompanying drawings, in which.

DETAILED DESCRIPTION

Figure 1:
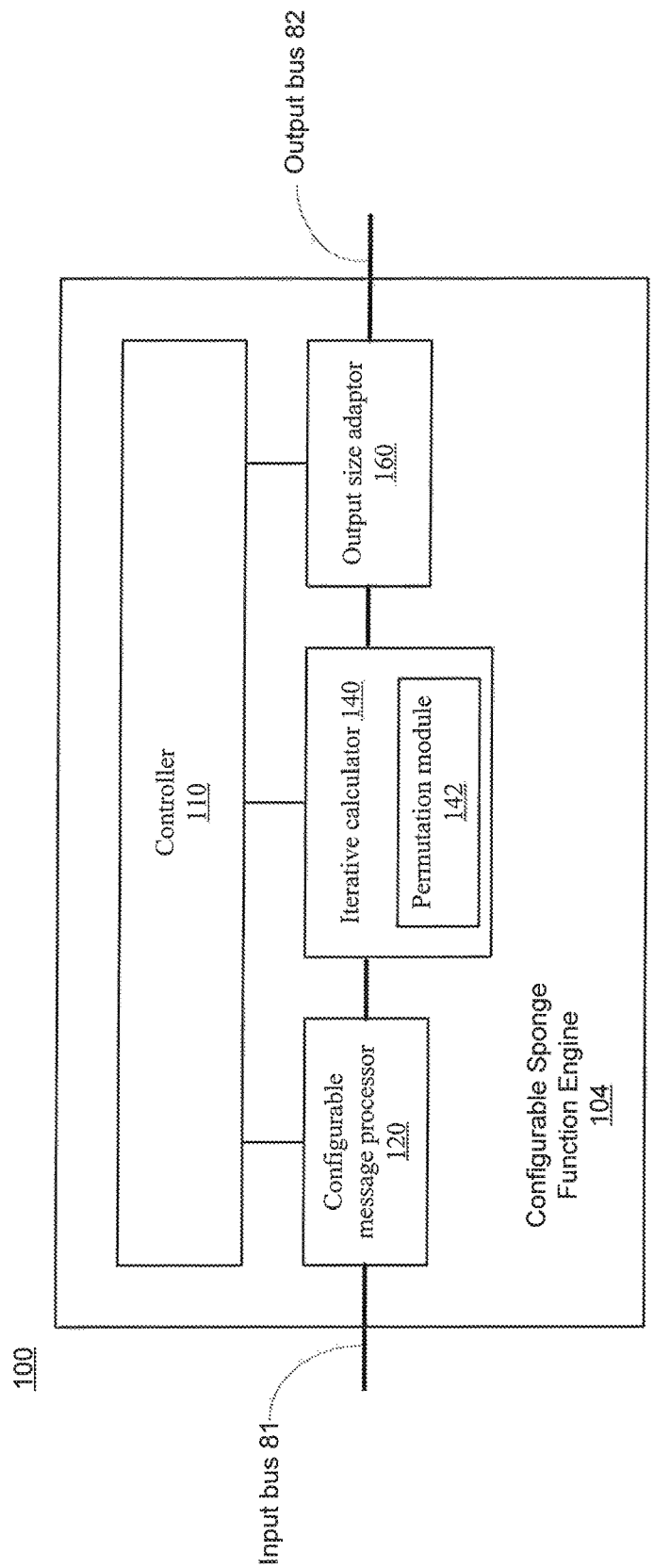
FIG. 1 illustrates a device that includes a configurable sponge function engine according to various embodiments of the present disclosure.

As explained above, conventional sponge function hardware calculators rely on particular bus widths that relegate a particular calculator to performing only a certain algorithm. However, as standards such as SHA evolve, there is an increased likelihood that different—and thus unsupported by current sponge function calculators—bus widths may need to be utilized. Also, and as will be explained in further detail below, a configurable sponge function engine allows a more specific tailoring of a security-versus-performance operating point, for example on an application-by-application basis. Thus, there is a need for a sponge function hardware engine that can be upgraded, or easily configured to accommodate different standards and application needs.

Conventionally, a sponge function may be implemented using a state memory divided into a bitrate portion (having size 'r' bits) and a capacity portion (having size 'c' bits). A padding function appends bits to an input string to generate a padded input string that is divisible by the bitrate (i.e., the size 'r' of the bitrate portion) so that the padded input string can be fragmented into r-bit blocks. A permutation function iteratively permutes the state memory until all of the r-bit blocks of the padded input string have been processed. However, as explained above, such sponge function calculators utilize internal data paths designed to support a particular bitrate and capacity, and thus cannot be used to implement evolving standards or algorithms that may require a different bitrate and capacity.

Various embodiments of the present disclosure are directed to a configurable sponge function engine in which a bitrate and capacity of the sponge function may be varied within a particular range. In particular, an internal data bus width of the configurable sponge function corresponds to a sum of the bitrate and capacity and thus is fixed. However, various control signals from a controller are leveraged to vary the bitrate and capacity within this fixed sum, and thus the sponge function implemented by the configurable sponge function engine may be varied to suit different application needs.

As a result, the configurable sponge function engine may satisfy future-developed and presently unknown bitrate requirements of various standards without necessitating a redesign of the engine itself. The configurable sponge function engine may also be configured or adapted for particular, but varying, customer requirements. In other examples, the configurable sponge function engine may be tailored to apply certain sponge function schemes for one application or virtual machine executed by a computer, while applying a different sponge function scheme for another application or virtual machine executed by the computer. In addition to the ability to control the bitrate and capacity of the sponge function, the configurable sponge function engine described herein may control various other parameters throughout the process of applying a sponge function to an input message, which will be more fully described below.

Turning now to FIG. 1, a system 100 is shown that includes an example of a configurable sponge function engine 104 in accordance with certain embodiments of the present disclosure. The system 100 may be a computer, a part of a computer, a communication device, a part of a communication device, or other device that utilizes access to a sponge function engine. The configurable sponge function engine 104 has at least one hardware component. As shown, the configurable sponge function engine 104 includes a controller 110 coupled to a configurable message processor 120, an iterative calculator 140, and an output size adaptor 160.

An input string or message is received from another portion of the system 100 by the configurable sponge function engine 104 by way of an input bus 81. Similarly, the output of the configurable sponge function engine 104 is provided to another portion of the system 100 by way of an output bus 82. In some embodiments, the input and output busses 81, 82 may comprise a single (e.g., bi-directional) bus, while in other embodiments the input and output busses 81, 82 are separate as shown.

The configurable message processor 120 receives an input message by way of the input bus 81, which may be a parallel bus having a width of size 'd'. The input message may be referred to as having size 'N'; that is, the input message comprises N bits. Generally, the configurable sponge function engine 104 may receive an input message having any size (i.e., N may vary) and apply a sponge function to the input message to produce an output message of any desired length. As explained above, the sponge function may be used to implement various cryptographic primitives such as cryptographic hashes, message authentication codes, stream ciphers, block ciphers, pseudo-random number generators, and authenticated encryption.

The input message also may include or be associated with input attributes, which are also received by the configurable message processor 120, that specify various attributes of the input message, such as delimiting a start point and end point for the input message. In some cases the input attributes may be specified by a header of the input message; however, the input attributes may be supplied to the configurable message processor 120 in other ways as well. The configurable message processor 120 then processes the input message by fragmenting the input message into fragments of the size specified by a bitrate control signal received from the controller 110. That is, the controller 110 provides an indication of fragment size, which corresponds to the bitrate (having size 'r'), to the configurable message processor 120. For example, in certain embodiments the input message is of a size that is much greater than the indicated bit rate, and thus may be fragmented into multiple r-bit fragments. In addition, the configurable message processor 120 may associate attributes with each fragment, such as attributes that indicate a fragment corresponding to the start point of the input message and a fragment corresponding to the end point of the input message.

The bitrate control signal sent by the controller 110 may be programmed or adjusted in various ways. For example, in some instances the bitrate control signal is preprogrammed for an applications-specific use of the configurable sponge function calculator 104, such as where the configurable sponge function calculator 104 is to be used to implement a particular standard or cryptographic function. In other instances, the bitrate control signal provided by the controller 110 may be varied or controlled externally on a per-application basis. Specific instances of such control over the bitrate control signal provided by the controller 110 are discussed in further detail below.

The configurable message processor 120 also pads the input message, if required, to ensure that the input message is evenly divisible by the bitrate (i.e., the size 'r' of the bitrate portion) indicated by the controller 110. For example, if an input message is 75 bits in length and the bitrate indicated by the controller 110 to the configurable message processor 120 is 16 bits, then fragmentation results in four 16-bit fragments with a remaining 11-bit fragment, which is padded to be 16 bits. In certain embodiments, the configurable message processor 120 applies a padding scheme specified by a padding control signal received from the controller 110. That is, the controller 110 provides an indication of the padding type to be applied. The padding scheme may vary by embodiment and it should be understood that the padding scheme and content may be compliant to any standard, including SHA-3, or any other requirement.

Regardless of the indication of fragment size and indication of padding type provided by the controller 110, the configurable message processor 120 in some embodiments may first fragment the input message based on the indication of fragment size provided by the controller 110 and then subsequently pad the message based on the indication of the padding type to be applied provided by the controller 110. However, in other embodiments, the configurable message processor 120 pads the input message and then subsequently fragments the message based on the indications provided by the controller 110.

The iterative calculator 140, which will be explained in further detail below with regard to FIGS. 2a-2c, includes a permutation module 142. The iterative calculator 140 and associated permutation module 142 implement the sponge function on the fragmented and/or padded blocks by carrying out various iterative operations and storing the results in a state register. In general, the iterative operations may include performing an operation such as an exclusive OR (XOR) or other logic operation on the fragmented block and, for example, the value stored in the state register, and iteratively applying a permutation function to the result of the logic operation. As will be explained in further detail below, after performing the logic operation on the fragmented block and another value, a number of iterations of the permutation function are applied to the result of the logic operation by the permutation module 142. In particular, the permutation module 142 applies the permutation function for a number of iterations specified by an iteration control signal received from the controller 110. That is, the controller 110 provides an indication to the permutation module 142 of the desired number of iterations to be performed on each result of the logic operation. Additionally, the controller 110 may provide control signals to the permutation module 142 to apply a single permutation function or multiple permutation functions for each iteration through the permutation module 142. Where multiple permutation functions are applied per iteration through the permutation module 142, the total number of iterations required (and thus time to permute a result of the logic operation) is reduced, for example by a factor of two where two permutation functions are applied per each iteration through the permutation module.

Once the desired number of iterations of the permutation function have been performed on the result of the logic operation, generating a permuted result, the permuted result is stored in the state register to overwrite the previous value of the state register. The logic operation is then performed on the next fragmented block and the new value of the state register. Once the iterative calculator 140 and associated permutation module 142 have processed the last block of the input string (e.g., indicated by a fragment attribute identifying that the fragment corresponds to the end point of the input message), the output size adaptor 160 receives the bitrate portion of the state register and converts the r-bit portion of the state register to the bus width of the output bus 82. In some examples, the output bus 82 is the same width as the input bus 81, and in these examples the output size adaptor 160 converts the r-bit portion of the state register into a d-bit width chunk to be output on the output bus 82.

In some embodiments, the controller 110 may specify a desired size (e.g., in bits) of an output stream or message. For example, in some cases the desired size of the output stream may be equivalent to the size of the input message. However, these need not always be the case, and in certain applications the size of the output stream may be greater or less than the size of the input message. In either event, the controller 110 determines whether an aggregated size of output chunks output by the output size adaptor 160 for a given input message is smaller than the desired size of output. If the controller 110 determines that the aggregate size (of output chunks output by the output size adaptor 160 for a given input message) is smaller than the desired size of output, then the controller 110 causes the permutation module 142 to perform another iterative permutation of the bitrate portion of the state register. In this case, the controller 110 also causes the output size adaptor 160 to output additional d-width (assuming for simplicity that the output bus 82 is of the same width as input bus 81) output chunks based on the updated value(s) of the state register until the desired size of output is satisfied.

Figure 2A:
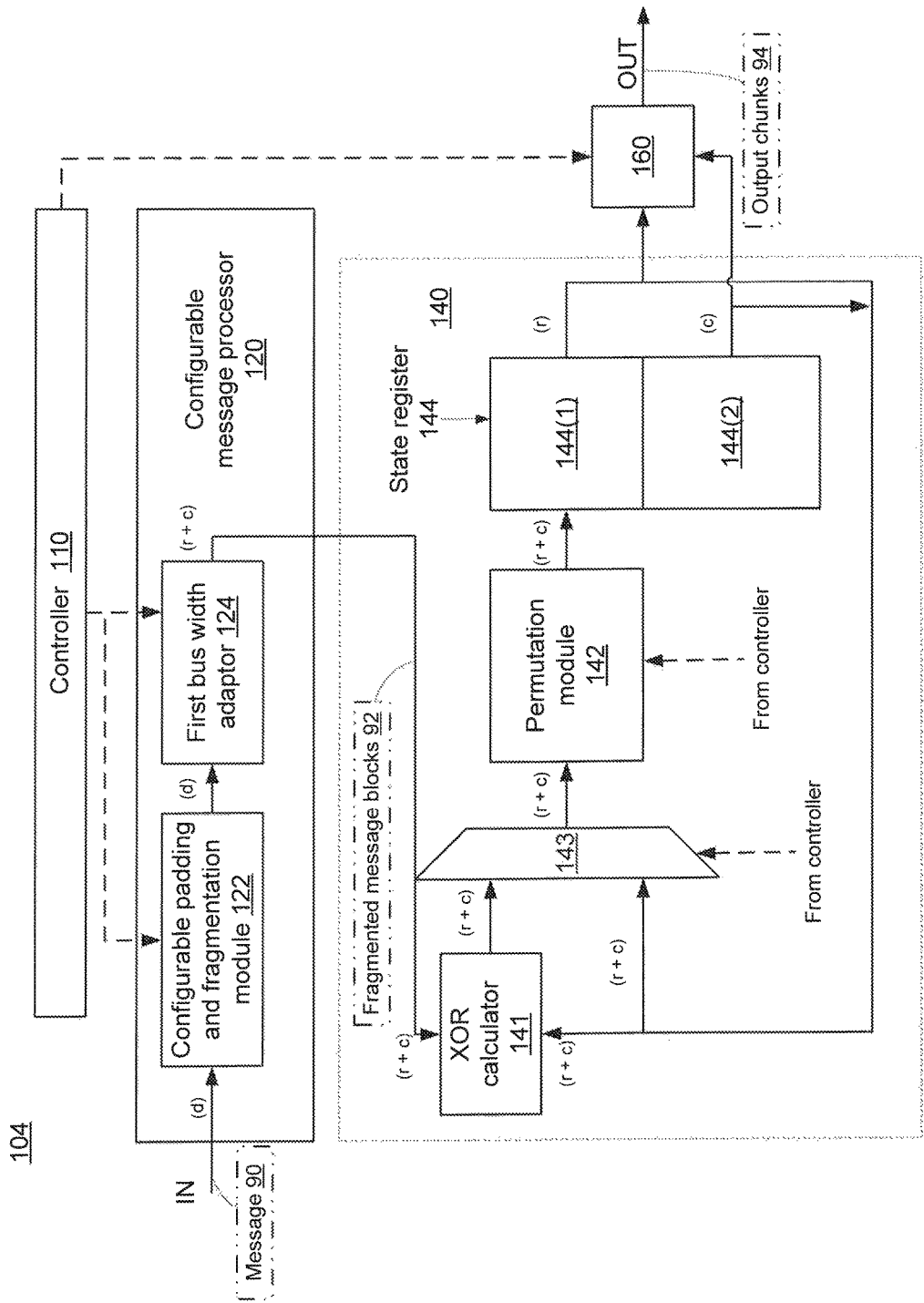
FIGS. 2a-2c illustrate a configurable sponge function engine according to various embodiments of the present disclosure.

Turning to FIG. 2a, a configurable sponge function engine 104 according to an exemplary embodiment is shown in further detail. The configurable message processor 120 includes both a configurable padding and fragmentation module 122 and a first bus width adaptor 124. The iterative calculator 140 includes the permutation module 142 referenced above as well as an XOR calculator 141, a multiplexer 143, and state register 144, any of which may receive control signals from the controller 110 as will be explained further below. The state register 144 includes both a bitrate portion 144(1) and a capacity portion 144(2). It should be appreciated that the state register 144 may also be of a fixed size as is the internal data bus width of the configurable sponge function, which corresponds to a sum of the bitrate and capacity. However, similar to the apportionment of the internal data bus between variable bitrate and capacity, the portions 144(1), 144(2) of the state register 144 may also vary in size depending on the bitrate control signals from the controller 110.

Figure 3A:
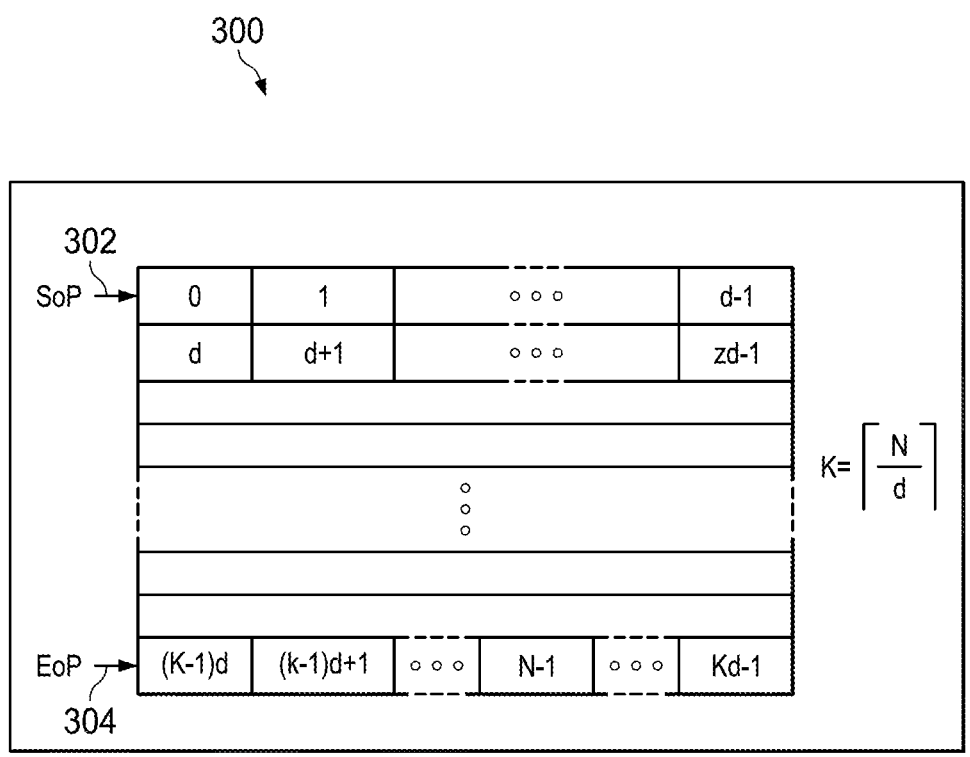
FIGS. 3a-3c illustrate various examples of packet fragmentation and padding according to various embodiments of the present disclosure.
Figure 3B:
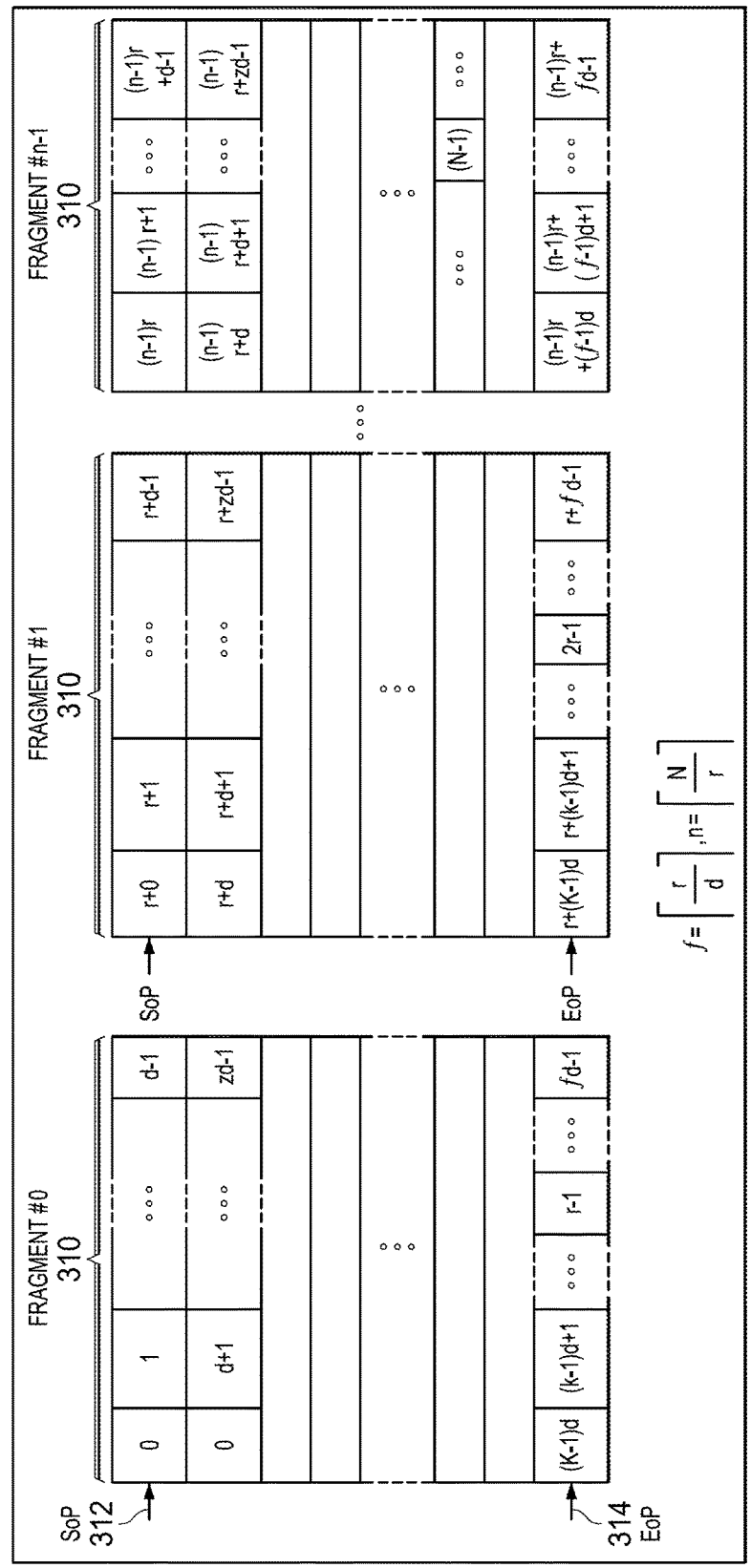
Figure 3C:
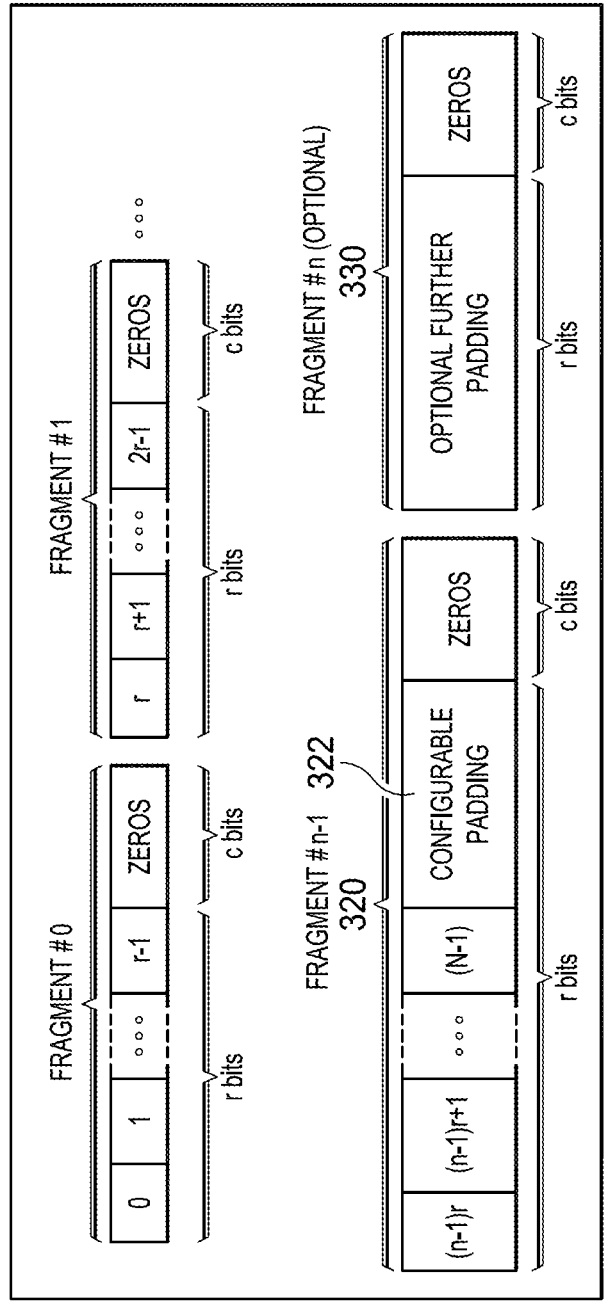

FIGS. 3a-3c demonstrate the transformation of an input message received by the configurable message processor 120 in accordance with various embodiments. From the outset it is noted that certain assumptions are made regarding input message length (denoted 'N'), input data bus 81 width (denoted 'd') and bitrate and capacity sizes (denoted 'r' and 'c', respectively) to arrive at FIGS. 3a-3c. However, it should be appreciated that these assumptions are for simplicity of explanation and that the scope of the present disclosure is not limited to any particular values of N, d, r, c, and other variable or configurable parameters. As one example, the input data bus 81 width d may be 64, 128, or 256 bits; the capacity c may be 448, 512, 768, or 1024 bits; and the bitrate r may be given by 1600-c. Of course, the input message length N may vary. Further, it should be appreciated that embodiments of the present disclosure allow for many values of d, r, and c other than those listed above.

Turning to FIG. 3a and with reference to FIG. 2a, an N-bit input message 300 is shown where the input bus 81 is of width d. Each row of the N-bit input message 300 is d bits wide, corresponding to the input bus 81 width. A total of K rows are shown, where K is given by the ceiling of the number of bits N of the input message 300 divided by the input bus 81 width d. A start-of-packet (SoP) attribute 302 identifies the start point of the input message and an end-of-packet (EoP) attribute 304 identifies the end point of the input message. These attributes are provided along with the input message to the configurable padding and fragmentation module 122.

The configurable padding and fragmentation module 122 fragments the input message into fragments of size r, the value for r being specified by the controller 110. That is, the controller 110 provides a control signal to the configurable padding and fragmentation module 122 that identifies a value for r or the bitrate of the sponge function to be implemented by the engine 104. In some embodiments, the control signal may be a direct representation (e.g., a binary value) of a desired bitrate; however, in other embodiments, the control signal may merely correspond to a desired bitrate (e.g., a control signal of 0 specifies a bitrate of 100 and a control signal of 1 specifies a bitrate of 200).

FIG. 3b illustrates fragments 310 of size r (e.g., fragment #0 from bit 0 to bit r−1, fragment #1 from bit r to bit 2r−1, and fragment #n−1 from (n−1)r to N−1). At this stage, although the input message has been fragmented, the fragments may still be processed on a d-bit width data bus, with r>d in the example shown. As shown, f is given by the ceiling of the bitrate r divided by the input bus 81 width d and n is given by the ceiling of the number of bits N of the input message 300 divided by the bitrate r. In certain cases, r is not evenly divisible by d, and thus additional bits in the last row (of fragment #0 for example) are given as bits r−fd−1. Additionally, the configurable padding and fragmentation module 122 may assign fragment attributes to each fragment, such as a start-of-packet (SoP) 312 attribute and an end-of-packet (EoP) 314 attribute that indicate where the fragment begins and ends.

In many cases, the size of the input message N will not be evenly divisible by the bitrate r, and in these cases the configurable padding and fragmentation module 122 pads the input message according to a padding scheme, which may be specified by the controller 110, so that the size of the padded input message is divisible by the bitrate r. FIG. 3c illustrates one padding scheme 322 applied to the last fragment 320. One example padding scheme is to fill the bits to be padded first with a 1, then all 0s, and a final 1. Of course, such a scheme has a minimum number of two padding bits, a 1 followed by a 1. Thus, in some embodiments, the controller 110 may specify and the configurable padding and fragmentation module 122 may implement this padding scheme even where only one bit is to be padded by appending an additional fragment 330, as shown in FIG. 3c, for padding purposes only (i.e., to complete the specified padding scheme). In such a situation, the single remaining bit of the first r bits of the final fragment #n−1 is set to a 1 and an additional fragment of r−1 0s followed by a 1 is created to provide further padding to complete this particular padding scheme.

FIG. 3c also illustrates the bus width conversion performed by the first bus width adaptor 124. In some cases, the first bus width adaptor 124 may comprise a serial-to-parallel gearbox or other known device to facilitate bus-width conversion. In particular, and in accordance with the embodiments of the present disclosure, each fragment has been converted to a bus width of r+c, or the sum of the bitrate and capacity of the sponge function (or state register 144). Thus, r bits of each fragment correspond to the input message, while the remaining c bits are set to 0s. The data bus width from this point to the output size adaptor 160 is the sum of the bitrate and the capacity, and is fixed. However, because the value of r is adjustable by the controller 110, which is providing control signals to the configurable padding and fragmentation module 122, many different combinations of r and c may be implemented by the configurable sponge function engine 104.

After a fragmented (and possibly padded) message block 92 shown in FIG. 2a (i.e., the fragment described in FIGS. 3b and 3c) is converted to a bus width of r+c as described above, the fragmented message block 92 passes to the iterative calculator 140. In particular, the XOR calculator 141 performs an XOR operation on the fragmented message block 92 and the value of the state register 144. In the case of the first fragmented message block 92 for a given input message, the state register 144 may be initialized to all 0s.

The XOR calculator 141 performs the XOR operation on all r+c bits of the fragmented message block 92 and all r+c bits of the state register 144 (i.e., the XOR calculator 141 XORs the first bit of the fragmented message block 92 with the first bit from the register 144, the second bit of the block 92 with the second bit from the register 144, and so forth). As a result, the functionality of the XOR calculator 141 itself does not change even when the value of r may be changed by the controller 110. The r+c bit output of the XOR calculator 141 as well as the r+c bit values held in the state register 144 are provided to the multiplexer 143. Additionally, the controller 110 provides control signals to the multiplexer 143 such that the output of the multiplexer 143 is a combination of: 1) r bits that correspond to the XOR operation of the input message and/or padding portion of the message block 92 and the bitrate portion 144(1) of the state register 144 and 2) c bits that correspond to the value of the capacity portion 144(2) of the state register 144. In this way, the capacity portion 144(2) of the state register 144 is "passed through" the XOR calculator 141 in a configurable manner based on the control signals supplied by the controller 110 to the multiplexer 143, while the number of bits provided to the XOR calculator 141 is independent of particular values of r and c specified by the controller 110. Further, the scope of the present disclosure is not limited to the embodiment described above that utilizes the multiplexer 143, but rather includes other methods or devices for selectively carrying out a logic operation (i.e., on only a portion of bits subject to the logic operation) while allowing other bits to "pass through" the logic operation unmodified.

The result of the XOR calculator 141 and multiplexer 143 is provided to the permutation module 142, which iteratively applies a permutation function in accordance with the implemented sponge function. In certain embodiments, the controller 110 may supply control signals to the permutation module 142 that specify the type of permutation function to be applied, for example by implementing permutation functions with lookup tables that may subsequently be re-wired or configured to be implemented differently. The controller 110 may also supply control signals to the permutation module 142 that specify the number of iterations to be applied to each result of the logic operation (e.g., 24 iterations in one case). Additionally, and as will be explained further with respect to FIG. 2b, the controller 110 may supply control signals to the permutation module 142 that specify whether to apply one, two, or more permutation functions per each iteration through the permutation module 142 if the configurable sponge engine 104 is so equipped. The state register 144 is then updated with the permuted result of the permutation module 142, and the process repeats itself with the next fragmented message block 92 being XOR'd with the updated state register 144, and so on. In some embodiments, the controller 110 identifies when the last fragment is processed (e.g., by identifying an end of packet fragment attribute associated with the last fragment) and subsequently causes the output size adaptor 160 to begin outputting the value in the state register 144 in output chunks 94 having width d, in the illustrative case where the output bus 82 is of the same width as the input bus 81. In certain embodiments, the output size adaptor 160 may comprise a parallel to serial gearbox or other known device to facilitate bus-width conversion.

Figure 2B:
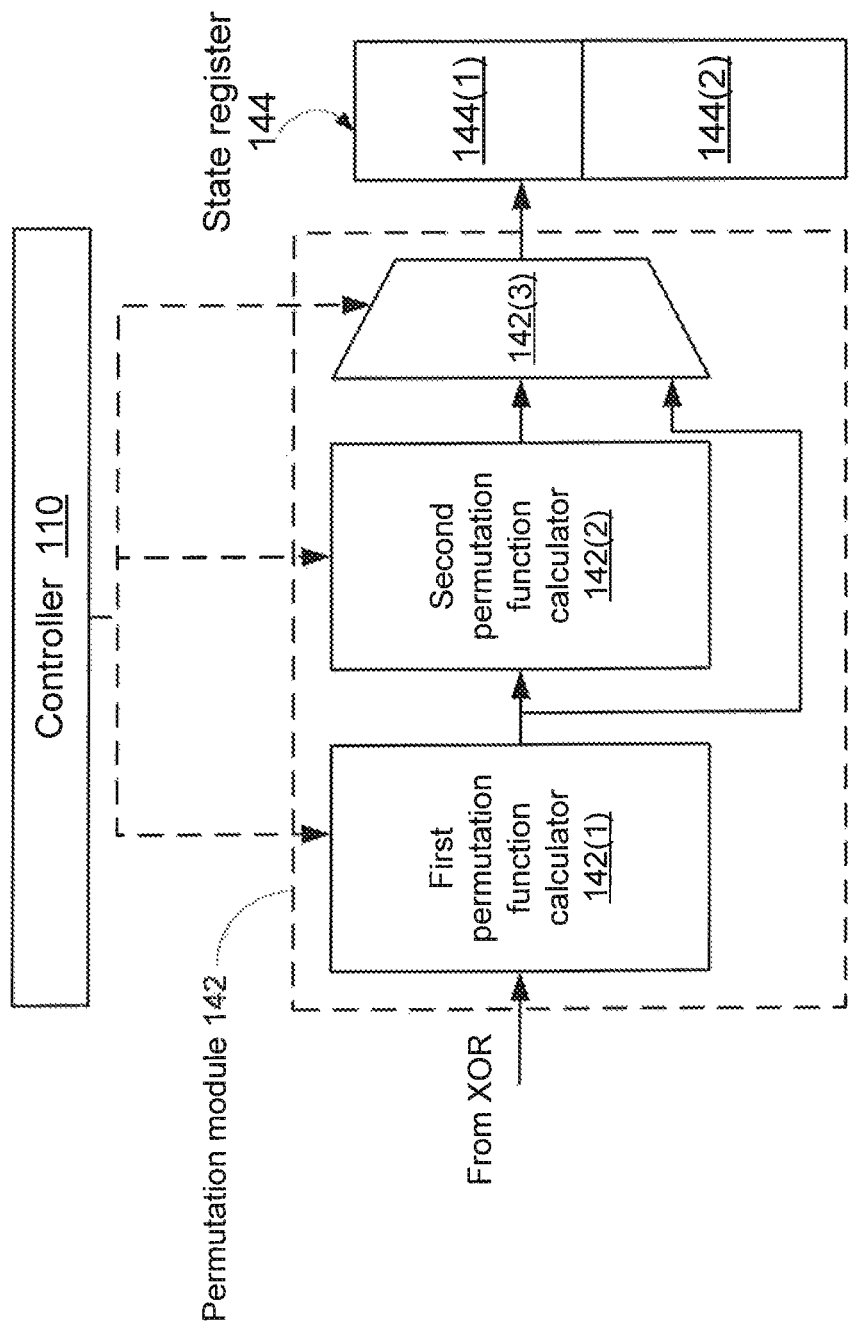

FIG. 2b illustrates details of one embodiment of the permutation module 142 from FIG. 2a. As explained above, the controller 110 may supply control signals to the permutation module 142 that specify whether to apply one, two, or more permutation functions per iteration through the permutation module 142 of the permutation function if the configurable sponge engine 104 is so equipped. As shown in FIG. 2b, the configurable sponge function engine 104 includes a permutation module 142 that includes a first permutation function calculator 142(1), a second permutation function calculator 142(2), as well as a second multiplexer 142(3). Of course, other embodiments may include more than two permutation calculators as well. The permutation function applied by the calculators 142(1), 142(2) is the same, but applying multiple permutation functions per iteration through the permutation module 142 reduces the amount of time required to apply the desired number of permutation functions.

The second multiplexer 142(3) selects between an output of the first permutation function calculator 142(1) and an output of the second permutation function calculator 142(2) based on a control signal received from the controller 110. The second permutation function calculator 142(2) is fed with an output of the first permutation function calculator 142(1). As a result, the selection made by the second multiplexer 142(3) determines whether a single iteration through the permutation module 142 involves applying one permutation function or two permutation functions. For example, where the number of iterations of the permutation function to be applied is odd, the controller 110 would cause the "final" pass through the permutation module 142 to result in the multiplexer 142(3) selecting the first permutation function calculator 142(1) as the result to be output.

Figure 2C:
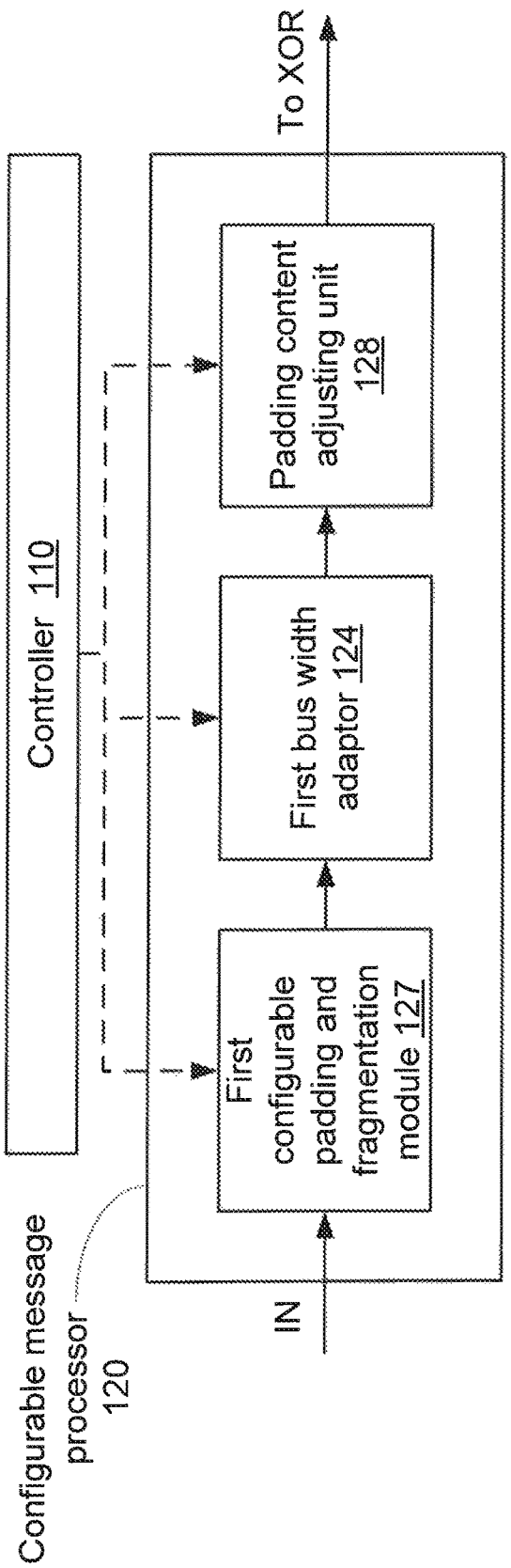

FIG. 2c illustrates an alternative embodiment of the configurable message processor 120. As explained above, in some instances it may be necessary to append an additional fragment to the message 90 to ensure that the selected padding scheme is implemented properly. To this end, the configurable message processor 120 includes a first configurable padding and fragmentation module 127 and a first bus width adaptor 124, which are similar to the padding and fragmentation module 122 and bus width adaptor 124 of FIG. 2a. Additionally, the processor 120 includes a second padding content adjusting unit 128.

The first configurable padding and fragmentation module 127 may perform an initial padding operation on message fragments. The initial padding may use default padding content, while the second padding content adjusting unit 128 replaces at least a part of content that was initially padded with padding content supplied by the controller 110, for example based on a particular padding scheme such as bit padding, zero padding, or other padding standards. Additionally or alternately, the padding content adjusting unit 128 may pad the data into an integer number of full "bitrate-length" fragments or add an additional fragment (N+1) in some cases defined by the padding scheme, for example as explained above.

In particular embodiments, the above-described configurable sponge function engine 104 can offer advantages over conventional sponge function calculators. For example, the configurable sponge function engine 104 is able to support many different algorithms (e.g., different combinations of bitrate and capacity values, different numbers of permutation iterations to be performed per pass through the permutation module 142), which may be based on various and even currently-undefined bitrate/capacity combinations, permutation functions, output rules, and the like. Further, various applications or systems may require or benefit from applying sponge functions to target a specific security-versus-performance speed tradeoff, and the disclosed configurable sponge function engine 104 could be utilized to offer such varying performance points.

As explained above, the bitrate control signal sent by the controller 110 may be programmed or adjusted in various ways. As one example, certain embodiments of the present disclosure may be directed to a server running one or more virtual machines, some of which possess varying security-versus-performance requirements. The disclosed configurable sponge function engine 104 would allow a virtual machine that favors performance to utilize a larger bitrate by varying the bitrate control signal sent by the controller 110, which results in a faster processing time at the expense of some security; while another virtual machine that favors security could utilize a smaller bitrate by varying the bitrate control signal sent by the controller 110, which results in a slower processing time but with an enhanced security. In a similar manner, although at a more macro level, various customers or users may desire certain security-versus-performance points, and the disclosed configurable sponge function engine 104 could be tailored for each customer's needs without requiring implementing individualized hardware solutions for each customer. Although these benefits are exemplary and not limiting, such features are not achievable using a conventional sponge function calculator.

Figure 4:
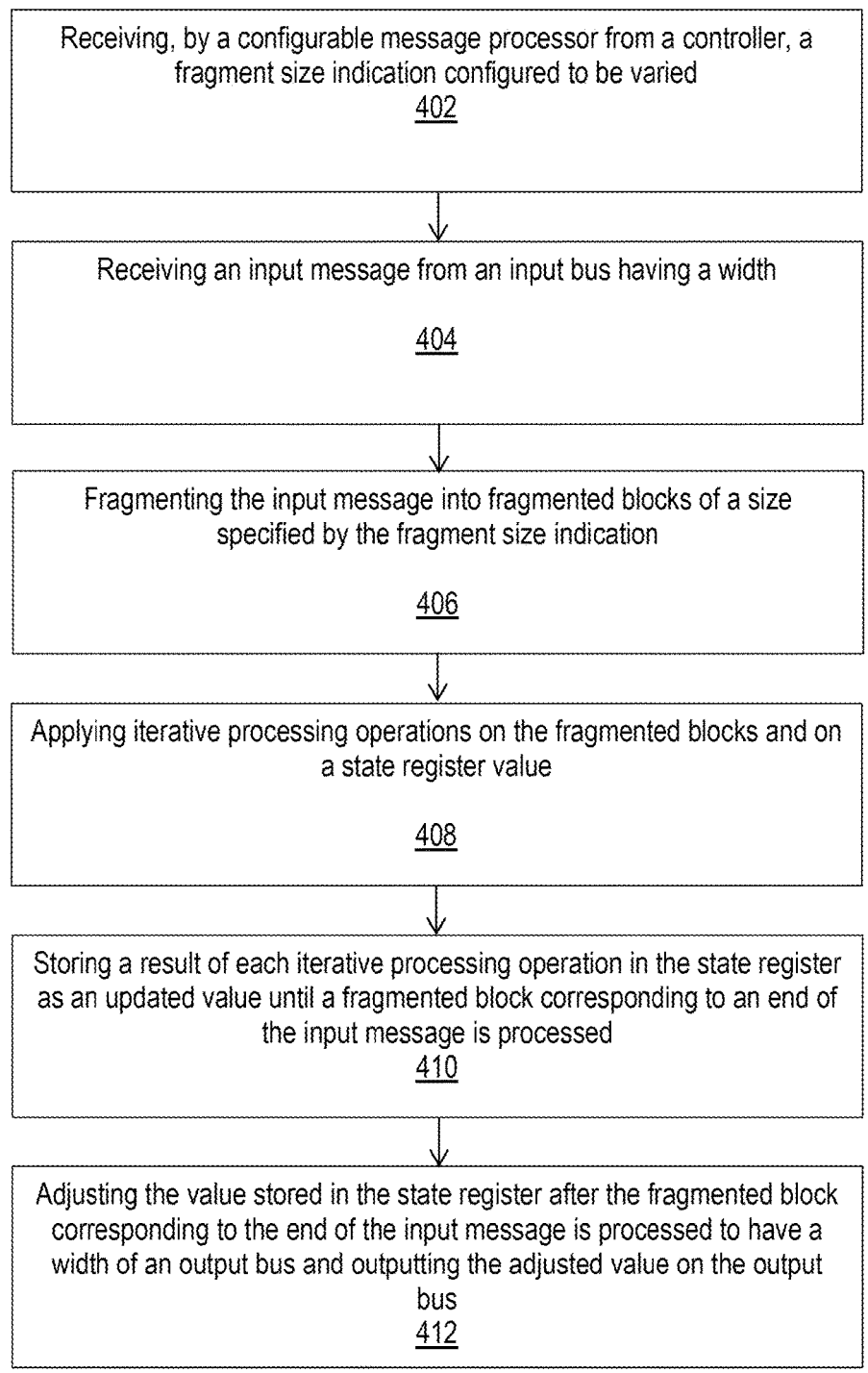
FIG. 4 illustrates a flow chart of a method according to various embodiments of the present disclosure.

FIG. 4 shows a flow chart of method 400 for calculating a sponge function. The method 400 may be implemented by hardware, such as that described herein, or other types of hardware elements. The various operations depicted may be performed in the order shown, or in a different order. Further, two or more of the operations may be performed in parallel rather than sequentially.

The method 400 begins in block 402 with receiving a fragment size indication that may be varied on a per-application basis. As explained above, the controller 110 may generate a control signal that indicates a particular bitrate value for use in subsequent sponge function calculations. Unlike conventional sponge rate calculators, however, the method 400 of the present disclosure allows the fragment size to be varied depending on the requirements of particular applications, virtual servers, and other entities requiring use of the configurable sponge function calculation.

The method 400 continues in block 404 with receiving an input message from an input bus having a particular bus width d. The method continues in block 406 with fragmenting the input message into fragmented blocks of a size specified by the fragment size indication. In some embodiments, the fragment size indication corresponds to a bitrate size of the sponge function or r. At this stage, although the input message has been fragmented, the fragments may still be d bits wide. As shown in FIG. 3a as an example, r>d. Additionally, although not shown in FIG. 4, fragment attributes may be assigned to each fragment, such as a start of packet and end of packet attribute that inform of where the fragment begins and ends. As above, in some embodiments, the fragmented blocks are converted to a bus width equal to the sum of the bitrate and capacity for the sponge function. Further, in some embodiments, the portion of the fragmented block corresponding to the capacity may be set to all 0s.

The method 400 then continues in block 408 with applying iterative processing operations on the fragmented blocks and a state register value. These iterative processing operations may include applying a logic operation such as an XOR operation on the fragmented block and on a value stored in the state register and applying a permutation function to the result of the XOR operation to generate a permuted result. In block 410, the method includes storing the permuted result in the state register. In certain embodiments, the permutation function or associated aspects may be specified by one or more control signals from the controller. This iterative processing step may continue until a fragmented block corresponding to an end of the input message (e.g., indicated by an attribute indicating the end point of the input message) has been processed.

At 412 the method includes adjusting the value stored in the state register after the fragmented block corresponding to the end of the input message is processed to have a width of an output bus and outputting the adjusted value on the output bus. As explained above, since the state register has a different width than the input and/or output bus widths, the value stored in the state register may be adjusted to have a width of the output bus.

In various embodiments, any of the disclosed technologies may be implemented as part of a microprocessor, an application-specific integrated circuit (ASIC), a system-on-a-chip (SoC), a field-programmable gate array (FPGA), or another type of hardware.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing detailed description, numerous specific details are set forth in order to provide a thorough understanding of the disclosed technologies. However, it will be understood by those skilled in the art that some embodiments may be practiced without these specific details. In other instances, well-known methods, procedures, and components have not been described in detail so as not to obscure the disclosure. Numerous variations and modifications will become apparent to those skilled in the art once the above disclosure is fully appreciated. It is intended that the following claims be interpreted to embrace all such variations and modifications.

What is claimed is:

1. A configurable sponge function engine, comprising:
 a register comprising a bitrate section having a variable bitrate size, and a capacity section having a variable capacity size, wherein a sum of the bitrate and capacity sizes is fixed;
 a controller configured to generate a bitrate size indication;
 a message processor configured to:
  fragment an input message into fragmented blocks of a size specified by the bitrate size indication; and
  convert the fragmented blocks to a bus width equal to the sum of the bitrate and capacity sizes;
 an iterative calculator configured to:
  perform iterative processing operations on the fragmented blocks; and
  overwrite a previous register value with a result of each iterative processing operation until a fragmented block corresponding to an end of the input message is processed; and
 a size adaptor configured to convert a value stored in the register after the fragmented block corresponding to the end of the input message is processed to have a width of an output bus.

2. The configurable sponge function engine of claim 1 wherein the message processor is further configured to:
 determine whether a size of the input message is evenly divisible by the bitrate size; and
 apply a padding scheme to the input message to create a padded input message having a size that is evenly divisible by the bitrate size;
 wherein the controller is configured to provide one or more control signals to alter the padding scheme applied to the input message.

3. The configurable sponge function engine of claim 1 wherein when the iterative calculator performs iterative processing operations, the iterative calculator is further configured to:
- receive one of the fragmented blocks from the message processor;
- apply an XOR operation on the fragmented block and on a value stored in the register to generate an XOR result;
- replace a capacity portion of the XOR result with values from the corresponding capacity section of the register to create a modified XOR result;
- apply a number of permutation iterations of a permutation function to the modified XOR result to generate a permuted result; and
- store the permuted result the register.

4. The configurable sponge function engine of claim 3 wherein the controller is further configured to:
- determine that an aggregate size of output register values is less than a desired output size; and
- as a result of the determining:
  - cause the iterative calculator to apply the permutation function to a current register value to generate a permuted result and store the permuted result in the register.

5. The configurable sponge function engine of claim 1, wherein the configurable sponge function engine is part of a microprocessor, an application-specific integrated circuit (ASIC), a system-on-a-chip (SoC), or a field-programmable gate array (FPGA).

6. A sponge function engine, comprising:
- a controller configured to generate a variable fragment size indication;
- a message processor configured to fragment an input message into fragmented blocks of a size specified by the fragment size indication;
- an iterative calculator configured to perform iterative processing operations on the fragmented blocks and overwrite a previous value of a register with a result of each iterative processing operation until a fragmented block corresponding to an end of the input message is processed; and
- an output size adaptor configured to output on an output bus a value stored in the register after the fragmented block corresponding to the end of the input message is processed, wherein the register value is adjusted to have a width of the output bus.

7. The sponge function engine of claim 6 wherein when the iterative calculator performs iterative processing operations, the iterative calculator is further configured to:
- receive one of the fragmented blocks from the message processor;
- apply an XOR operation on the fragmented block and on a value stored in the register to generate an XOR result;
- apply a number of permutation iterations of a permutation function to the result of the XOR operation to generate a permuted result; and
- update the register to store the permuted result.

8. The sponge function engine according to claim 7 wherein the controller is configured to generate a permutation control signal and the iterative calculator is configured to either apply a single permutation function per each permutation iteration or multiple permutation functions per each permutation iteration based on the permutation control signal.

9. The sponge function engine of claim 7 wherein the controller is further configured to:
- determine that an aggregate size of output register values is less than a desired output size; and
- as a result of the determining:
  - cause the iterative calculator to apply the permutation function to the current register value to generate a permuted result and store the permuted result in the register.

10. The sponge function engine of claim 6 wherein the message processor is further configured to:
- determine that a size of the input message is evenly divisible by the fragment size indication; and
- apply a padding scheme to the input message to create a padded input message having a size that is evenly divisible by the fragment size indication value;
- wherein the controller is configured to provide one or more control signals to alter the padding scheme applied to the input message.

11. The sponge function engine according to claim 10 wherein the configurable fragmentation module is configured to perform an initial padding operation on fragmented blocks and then replace at least a part of content that was initially padded by padding content supplied by the controller.

12. The sponge function engine of claim 6, wherein the sponge function engine is part of a microprocessor, an application-specific integrated circuit (ASIC), a system-on-a-chip (SoC), or a field-programmable gate array (FPGA).

13. A method for calculating a sponge function, comprising:
- fragmenting an input message into fragmented blocks of a size specified by a fragment size indicator;
- applying iterative processing operations on the fragmented blocks and on a register value, the register value being stored in a register;
- storing a result of each iterative processing operation in the register as an updated value until a fragmented block corresponding to an end of the input message is processed;
- adjusting the value stored in the register after the fragmented block corresponding to the end of the input message is processed to have a width of an output bus; and
- outputting the adjusted value on the output bus.

14. The method of claim 13 wherein the iterative processing operations further comprise:
- receiving one of the fragmented blocks from the message processor;
- applying an XOR operation on the fragmented block and on a value stored in the register to generate an XOR result;
- applying a number of permutation iterations of a permutation function to the result of the XOR operation to generate a permuted result; and
- updating the register to store the permuted result.

15. The method according to claim 14 further comprising:
- receiving a permutation control signal from the controller; and
- based on the permutation control signal, applying either a single permutation function per each permutation iteration or multiple permutation functions per each permutation iteration.

16. The method of claim 14 further comprising:
- determining, by the controller, that an aggregate size of output register values is less than a desired output size; and
- as a result of the determining:

applying the permutation function to the current register value to generate a permuted result and updating the register to store the permuted result; and outputting on the output bus the updated register value converted to have a width of the output bus.

17. The method of claim 13 further comprising:

determining, by the message processor, that a size of the input message is not evenly divisible by the fragment size indication value; and applying a padding scheme to the input message to create a padded input message having a size that is evenly divisible by the fragment size indication value.

18. The method according to claim 17 further comprising performing an initial padding operation on fragmented blocks and then replacing at least a part of content that was initially padded by padding content received from the controller.

19. The method of claim 13, wherein the method is performed by a microprocessor, an application-specific integrated circuit (ASIC), a system-on-a-chip (SoC), or a field-programmable gate array (FPGA).

* * * * *